(12) United States Patent
Boland

(10) Patent No.: US 8,923,832 B2
(45) Date of Patent: Dec. 30, 2014

(54) MULTIPLEXING VOIP STREAMS FOR CONFERENCING AND SELECTIVE PLAYBACK OF AUDIO STREAMS

(75) Inventor: Simon Boland, Sydney (AU)

(73) Assignee: Avaya Inc., Basking Ridge, NJ (US)

( * ) Notice: Subject to any disclaimer, the term of this patent is extended or adjusted under 35 U.S.C. 154(b) by 742 days.

(21) Appl. No.: 13/043,234

(22) Filed: Mar. 8, 2011

(65) Prior Publication Data

US 2011/0158133 A1 Jun. 30, 2011

Related U.S. Application Data

(62) Division of application No. 11/839,908, filed on Aug. 16, 2007, now Pat. No. 7,936,705.

(51) Int. Cl.
*H04M 3/42* (2006.01)
*H04Q 3/00* (2006.01)

(52) U.S. Cl.
CPC .................................. *H04Q 3/0045* (2013.01)
USPC ......................................................... 455/416

(58) Field of Classification Search
CPC .......... H04M 3/56; H04M 3/561; H04N 7/15; H04N 7/147
USPC .................. 370/260, 267, 351, 537; 455/416; 348/14.01–14.02, 14.08–14.09, 14.11
See application file for complete search history.

(56) References Cited

U.S. PATENT DOCUMENTS

| | | | | |
|---|---|---|---|---|
| 5,119,375 A | * | 6/1992 | Paneth et al. | 370/345 |
| 5,577,049 A | * | 11/1996 | Ito | 370/537 |
| 6,181,711 B1 | * | 1/2001 | Zhang et al. | 370/468 |
| 6,771,657 B1 | * | 8/2004 | Elstermann | 370/465 |
| 7,012,922 B1 | * | 3/2006 | Unitt et al. | 370/395.1 |
| 7,023,809 B1 | * | 4/2006 | Rubinstein et al. | 370/241 |
| 7,085,704 B2 | * | 8/2006 | Yik et al. | 703/19 |
| 7,272,153 B2 | * | 9/2007 | Cline | 370/466 |
| 7,382,796 B2 | * | 6/2008 | Haberman et al. | 370/429 |
| 7,409,702 B2 | * | 8/2008 | Cao | 725/110 |
| 7,525,994 B2 | * | 4/2009 | Scholte | 370/474 |
| 7,683,925 B2 | * | 3/2010 | Lee | 348/14.01 |
| 7,936,705 B1 | | 5/2011 | Boland | |
| 2001/0008531 A1 | * | 7/2001 | Lanigan et al. | 370/432 |
| 2003/0063573 A1 | * | 4/2003 | Vandermersch | 370/260 |
| 2004/0151206 A1 | | 8/2004 | Scholte | |
| 2004/0196825 A1 | * | 10/2004 | Scholte | 370/351 |
| 2007/0025538 A1 | * | 2/2007 | Jarske et al. | 379/202.01 |
| 2008/0030590 A1 | * | 2/2008 | Ciudad et al. | 348/211.12 |
| 2008/0068446 A1 | * | 3/2008 | Barkley et al. | 348/14.07 |

OTHER PUBLICATIONS

Scheuermann et al., "A Comprehensive Survey of Digital Transmultiplexing Methods", Proceedings of the IEEE, vol. 69, No. 11, Nov. 1981, 32 pages.
Koilpillai et al., "Cosine-Modulated FIR Filter Banks Satisfying Perfect Reconstruction", IEEE Transactions of Signal Processing, vol. 40, No. 4, Apr. 1992, 14 pages.

(Continued)

*Primary Examiner* — Brandon Miller
(74) *Attorney, Agent, or Firm* — Sheridan Ross P.C.

(57) ABSTRACT

The present invention provides methods, devices, and systems that provide the ability to playback multiple VoIP audio streams simultaneously with a single RTP session and further provides the ability to conference all streams together prior to transmission. More specifically, the present invention focuses on the transport layer and sample-based multiplexing employed to provide this capability.

16 Claims, 7 Drawing Sheets

(56) References Cited

OTHER PUBLICATIONS

Alkin et al., "Design of Efficient M-Band Coders with Linear-Phase and Perfect-Reconstruction Properties", IEEE Transactions on Signal Processing, vol. 43, No. 7, Jul. 1995, 12 pages.

Akansu et al., "Orthogonal Transmultiplexers in Communication: A Review", IEEE Transactions on Signal Processing, vol. 46, No. 4, Apr. 1998, 17 pages.

Tanigawa et al., "Simple RTP Multiplexing Transfer Methods for VoIP", Internet Draft draft-tanigawa-rtp-multiplex-01.txt, Nov. 18, 1998, 10 pages.

Official Action for U.S. Appl. No. 11/839,908, mailed May 13, 2009, 17 pages.

Final Office Action for U.S. Appl. No. 11/839,908, mailed Dec. 1, 2009, 15 pages.

Restriction Requirement for U.S. Appl. No. 11/839,908, mailed Mar. 5, 2010, 5 pages.

Official Action for U.S. Appl. No. 11/839,908, mailed Jun. 4, 2010, 13 pages.

Notice of Allowance for U.S. Appl. No. 11/839,908, mailed Dec. 29, 2010, 12 pages.

\* cited by examiner

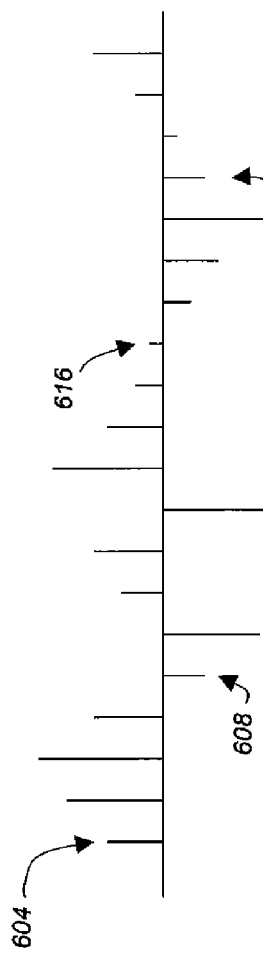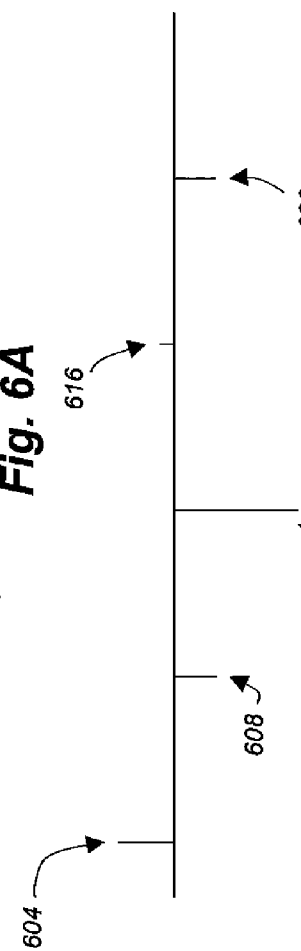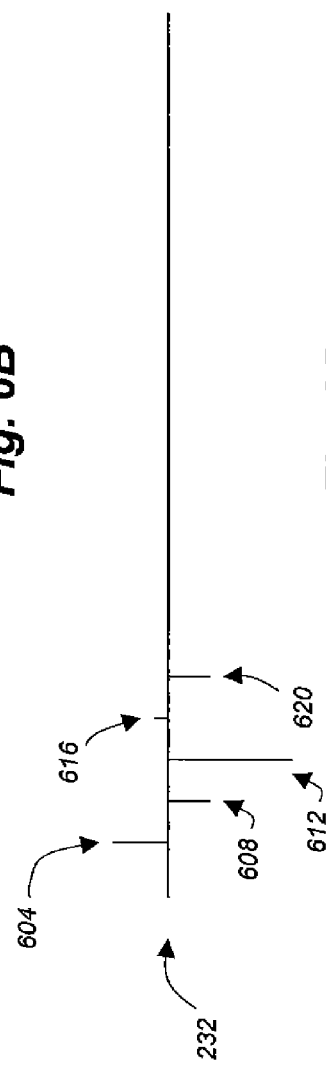

MULTIPLEXING VOIP STREAMS FOR CONFERENCING AND SELECTIVE PLAYBACK OF AUDIO STREAMS

CROSS-REFERENCE TO RELATED APPLICATIONS

This application claims the benefit of U.S. patent application Ser. No. 11/839,908, filed Aug. 16, 2007, the entire disclosure of which is hereby incorporated herein by reference.

FIELD OF THE INVENTION

The invention relates generally to signal processing and more particularly to processing VoIP audio streams.

BACKGROUND

The concept of multiplexing packet data flows, including Real-Time Transport protocol (RTP) flows together into a single aggregate flow is a concept that is addressed in a number of Internet Engineering Task Force (IETF) Internet drafts. Multiplexing RTP flows is desirable, because it can reduce the bandwidth usage of Wide Area Network (WAN) links and decrease the RTP packet rate incident on edge routers. In addition, the multiplexing of RTP flows reduces the burden of administering networks, for example in connection with the configuration of quality of service levels. In addition, multiplexing RTP flows can increase the scalability of existing quality of service schemes.

RTP multiplexing is a session layer technique that packetizes the different streams to create a compound packet containing the individual payloads from different RTP sessions as well as some additional control information. One shortcoming of RTP multiplexing is that it does not provide a conferencing capability to sum the audio streams together. Another shortcoming of RTP multiplexing is that every channel has to be encoded and decoded by a codec.

As can be seen in FIG. 1, a signal processing system 100 according to embodiments of the prior art comprises a plurality of source signals 108a-M that are passed through their own codec 112a-M prior to being multiplexed at the RTP multiplexer 116. The RTP multiplexer 116 causes each individual encoded signal to be combined into an aggregate signal and packetized according to RTP standards. The packetized signal is then transmitted across a communication network 104 to the receiving end where the signal is de-multiplexed at an RTP de-multiplexer 120 and the data from the packet is separated into individual channels. Thereafter, each signal is passed through another codec 124a-M where it is decoded. The result is a plurality of individual signals that are treated separately from one another. A downside to this solution is that if conferencing of the signals is desired, then each separate signal has to be provided to a mixing stage 128 where the signals can be summed at a summing point 132. Only thereafter can a coherent conference signal of the multiplexed streams be provided to a recipient.

As can be appreciated, prior multiplexing solutions do not lend themselves to conferencing applications particularly well because of all the excess processing overhead involved. It would be desirable to multiplex a plurality of signals in such a fashion that they can be easily utilized in conferencing applications without excessive processing steps.

SUMMARY

These and other needs are addressed by various embodiments and configurations of the present invention. The present invention is directed generally to a system, device, and method for improving the processing Voice over Internet Protocol (VoIP) audio streams. In accordance with one embodiment of the present invention, a communication method is provided. The method generally comprises:

receiving a plurality of electronic signals from a corresponding plurality of signal sources;

multiplexing the plurality of signals into a common electronic signal;

causing the common signal to be transmitted across a communication network; and providing the common signal to at least one communication device for playing on the communication device.

As noted, the signals include voice payloads generated by one or more speakers. The speakers may include human speakers as well as Interactive Voice Response (IVR) units or the like.

In accordance with at least some embodiments of the present invention, the multiplexing step is performed at the sample level and before any encoding of the signal occurs. The multiplexing step may include combining each of the plurality of signals into different channels on a common signal. The common signal can be intelligibly replayed without any de-multiplexing if the appropriate samples from the common signal are selected. Accordingly, the plurality of received signals can be conferenced and played without requiring a de-multiplexing step. This reduces the amount of processing overhead required. Additionally, the amount of packet overhead required to facilitate a conference call between a number of communication devices is reduced since the plurality of signals are multiplexed into a common signal that requires only one header per packet, instead of requiring a header for each individual signal packet. Moreover, since the common signal is a conferenced version of the plurality of signals, a user is provided with the ability to selectively playback all signals or a subset of the signals all with the simple click of a button.

In accordance with still other embodiments of the present invention, a packet is provided for use in a communication system. The packet generally comprises:

a header portion;

a trailer portion; and a payload portion, wherein the payload portion comprises first, second, and third sections, wherein the first section comprises information received from a first signal source, wherein the second section comprises information received from a second signal source, and wherein the third section comprises a combination of the information from the first signal source and second signal source.

In accordance with still other embodiments of the present invention, an apparatus is provided for generating packets for use in a communication system. The apparatus generally comprises:

an input for receiving a multiplexed electronic signal comprising first and second messages from respective first and second signal sources and a third message comprising a combination of the first and second messages;

an output for outputting at least one of the first message, the second message, and the third message; and a filter bank for de-multiplexing the electronic signal into the first and second messages, wherein the filter bank is employed to output the first and second messages and wherein the filter bank is not employed to output the third message.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 6A is a waveform graph depicting a first decoded multiplexed data signal for four input channels in accordance with embodiments of the present invention;

FIG. 6B is a waveform graph depicting a second decoded multiplexed data signal for four input channels in accordance with embodiments of the present invention;

FIG. 6C is a waveform graph depicting a conferenced output in accordance with embodiments of the present invention.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to multiplex different audio streams together efficiently and selectively playback all streams or a subset of the total streams, and with the minimal IP/UDP/RTP packet overhead.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof. Similarly, one or more functional portions of the system could be distributed between a server, gateway, PBX, and/or associated communication device.

Figure 1:
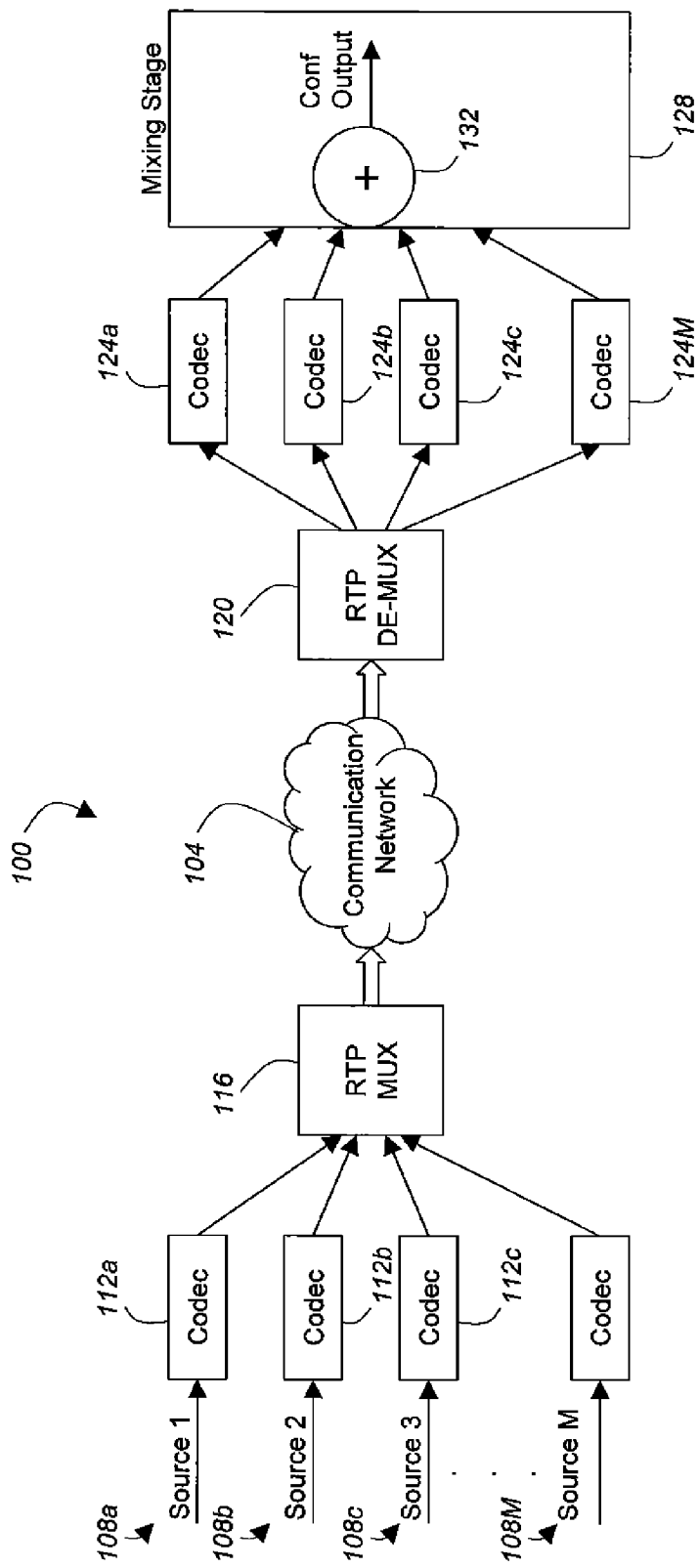
FIG. 1 is a block diagram of a signal processing system in accordance with embodiments of the prior art.
Figure 2:
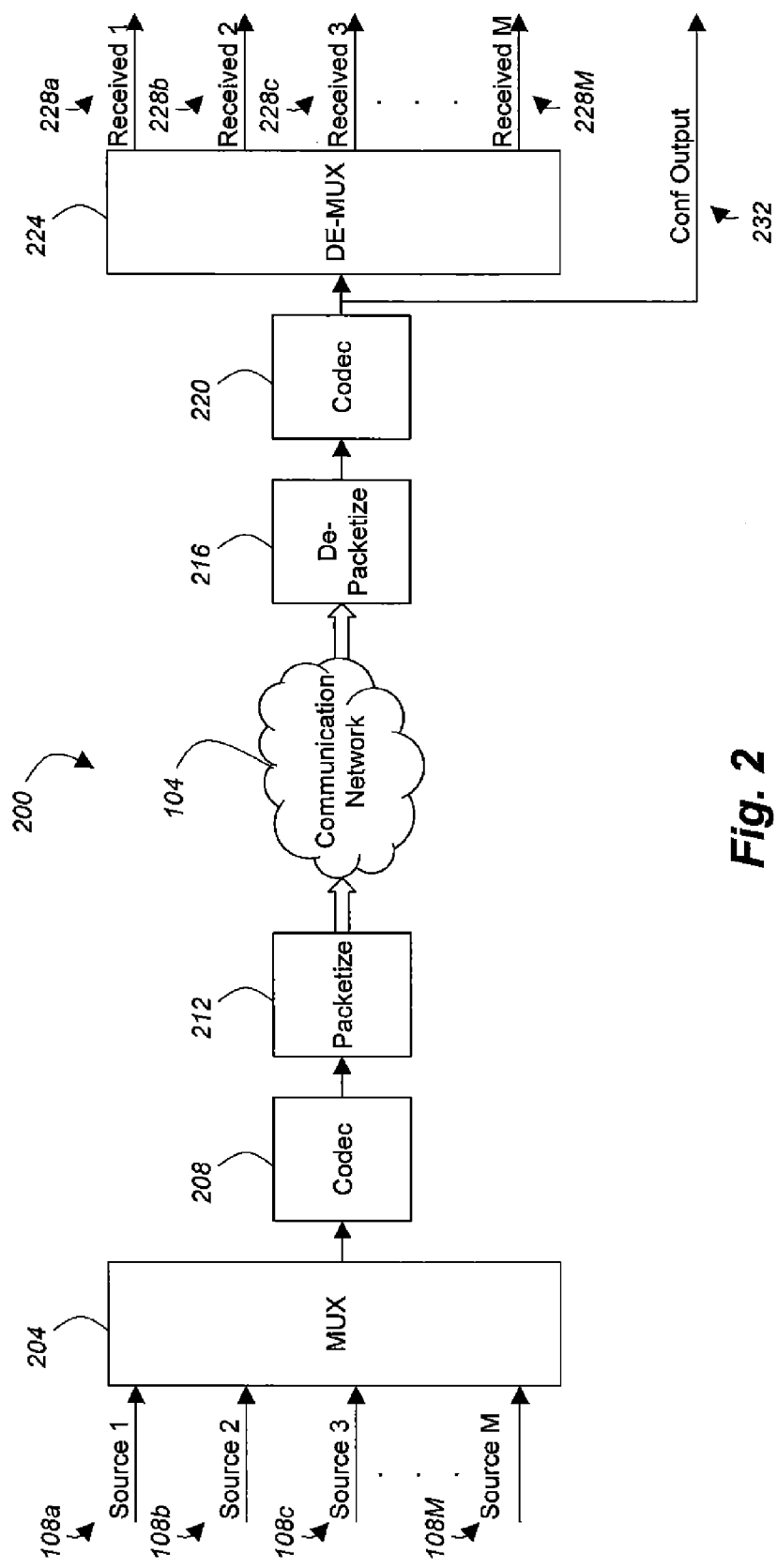
FIG. 2 is a block diagram of a signal processing system in accordance with embodiments of the present invention.

Referring initially to FIG. 2, a communication system 200 will be described in accordance with at least some embodiments of the present invention. The communication system 200 generally comprises a communication network 104 through which communication signals may be transmitted. The communication network 104 may comprise any type of information transportation medium and may use any type of protocols to transport messages between endpoints. The communication network 104 may include wired and/or wireless communication technologies. The Internet is an example of the communication network 104 that constitutes and IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), and any other type of packet-switched or circuit-switched network known in the art. In addition, it can be appreciated that the communication network 104 need not be limited to any one network type, and instead may be comprised of a number of different networks and/or network types. The communication network 104 may further include routers (not shown) and proxy servers (not shown) for transmitting data across the communication network 104. In accordance with at least some embodiments of the present invention, the communication network 104 is operable to support the transmission of packetized electronic messages from a transmission source to a transmission destination.

The communication system 200 may also comprise signal sources that are used to generate electronic signals 108a-M comprising analog and/or digital messages for transmission across the communication network 104. The signal sources comprise any type of electronic signal generation device such as, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, conventional wired or wireless telephones, cellular phones, Personal Digital Assistants (PDAs), video cameras, and the like. The signal sources are generally operable to generate and transmit audio messages, video messages, and/or data messages (e.g., email, text messages, SMS messages, etc.). As can be appreciated by one skilled in the art, the signal sources may also comprise switches, servers, and/or other dedicated processors used to provide services to client devices.

Although depicted as separate sources, one skilled in the art will appreciate that two or more signal sources may comprise the same actual source. For example, each of the signals may be provided from a voicemail server or the like. Each signal may correspond to a different message that has been left for a particular user and each message may be received from the same server. Accordingly, although the messages are transmitted as different signals, they are originated by the same source.

Components of an exemplary signal source, such as a communication device, may include a processor capable of executing program instructions. Accordingly, the processor may include any general-purpose programmable processor, digital signal processor (DSP) or controller for executing application programming. Alternatively, the processor may comprise a specially configured application specific integrated circuit (ASIC). The processor generally functions to run programming code implementing various functions performed by the signal source.

A signal source may additionally include memory for use in connection with the execution of programming by the processor and for the temporary or long-term storage of data or program instructions. The memory may comprise solid-state memory resident, removable or remote in nature, such as DRAM and SDRAM. Where the processor comprises a controller, the memory may be integral to the processor. The memory may be volatile and/or non-volatile memory.

In addition, the signal source may include one or more user inputs and one or more user outputs. Examples of user inputs include, without limitation, keyboards, keypads, touch screens, touch pads, microphones, lenses and other image capturing devices, and so on. Examples of user outputs include, but are not limited to, speakers, display screens (including touch screen displays), and indicator lights.

The signal sources further include a listing of supported communications protocols. The listing of communication protocols may define the various protocols that the signal source can employ to communicate over the communication network 104. For example, the communication protocols may enable the signal source to communicate using TCP, UDP, and/or any other type of IP transport protocol.

The signal source may also include one or more communication network interfaces. Examples of communication network interfaces include, but are not limited to, a network interface card, a modem, a wired telephony port, a serial or parallel data port, radio frequency broadcast receiver, a USB port, or other wired or wireless communication network interfaces.

Signals 108a-M transmitted from the signal sources are received at a multiplexer 204. The multiplexer 204 may comprise a filter bank that allows it to combine each received signal 108a-M into a common communication signal having a plurality of channels. The common communication signal produced by the multiplexer 204 may comprise electronic messages from each signal 108a-M on separate channels as well as an additional message that is the combination of all messages 108a-M on an additional channel. In other words, a channel may be provided on the common communication signal for each individual signal 108a-M. Additionally, the multiplexer 204 may mix all of the signals 108a-M together for transmission on the common communication signal.

Each electronic message multiplexed into the common communication signal may be directed toward a different destination address. Alternatively, each electronic message may be directed toward the same destination address (e.g., the same communication device). The signals 108a-M may be multiplexed according to any known type of multiplexing technique such as, for example, time division multiplexing (TDM), frequency division multiplexing (FDM), orthogonal frequency division multiplexing (OFDM), and so on.

RTP multiplexing techniques such as those described in U.S. Patent Publication No. 2004/0151206, the contents of which are hereby incorporated herein by this reference, may also be employed in accordance with at least some embodiments of the present invention. The '206 publication discusses the aggregation of data packets and super packets for transmission across a communication network. The '206 publication discusses the use of an identifier associated with individual data packet that is examined to determine whether such individual packets are suitable for inclusion in a super packet containing data packets associated with individual data flows. The identification may be included within a field established for a purpose other than marking an individual data packet in connection with forming aggregate packets. In particular, preexisting data fields may be utilized to identify packets for purposes of forming aggregate data streams.

Additional RTP multiplexing methods that may be employed in accordance with at least some embodiments of the present invention include those described in *Simple RTP Multiplexing Transfer Methods for VoIP*, by Tanigawa, the entire contents of which are hereby incorporated herein by this reference. The RTP multiplexing methods described by Tanigawa concatenate RTP packets destined for the same Internet Telephony Gateway (IP-GW) into a single UDP packet. The benefits of this method are that no new additional headers are required and the current well-defined H.323 and RTP standards can be used.

In accordance with at least some embodiments of the present invention, the multiplexer 204 places each signal 108 received from a different signal source onto a different channel within the same common signal. The channels may be defined within the common electronic signal either by frequency, amplitude, phase, or combinations thereof. After the separate signals have been combined into a common electronic signal by the multiplexer 204, the common signal is transferred to a codec 208 where the signal is encoded for transmission across the communication network 104. The codec chosen for the common signal may be selected based upon the sampling rate of the codec and the sampling rate of the common signal. The sampling rate of the common signal may depend upon the number of signals combined into the common signal and each separate signal's sampling rate. In accordance with at least some embodiments of the present invention, the sampling rate of the common signal may be equal to the highest sampling rate among the individual signals times a factor of M (i.e., the number of total signals being multiplexed into the common signal). For example, if four signals were provided to the multiplexer 204 and each signal was originally sampled at 8 kHz, then the common signal output by the multiplexer 204 would have a sampling rate of 32 kHz. This means that a codec operable to support a 32 kHz sampling rate should be employed. In accordance with embodiments of the present invention, the G.711 codec may be applied to the common signal.

After the common signal has been passed through the codec, the packetizer 212 packetizes the common signal. The packetizer 212 partitions the common signal into packets for transmission across the communication network 104. In accordance with at least some embodiments of the present invention, the packetizer 212 is operable to create packets that comprise a header, a trailer, and a payload portion for carrying the common signal. The header and trailer portion may define certain routing criteria and the payload portion may comprise the various messages on each respective channel including the separate messages and the combination of the separate messages. The header and/or trailer portions may also comprise an identifier that indicates the packet comprises a channel that includes a mixed representation or combination of the messages on the other separate channels. This identifier may be referenced at the receiving end to determine what sort of playback capabilities the packet comprises.

After the common signal has been passed through the packetizer 212, the packets of data are transmitted across the communication network 104 where they are received at the destination. In accordance with at least some embodiments of the present invention, the initial destination of the packets comprise a gateway. At the receiving end, the packetized common signal may be passed through a de-packetizer 212 that organizes the packets back into the order in which they were prior to transmission. Additionally, the de-packetizer 212 may reference other information in the header and/or footer such as the identifier described above to determine that the packet comprises a channel carrying a combination of the separate signals.

The de-packetized common signal is then supplied to a codec 220 on the receiving end. The receiving codec 220 decodes the common signal from its transmission format into a format suitable for playing on a communication device. The combination section of the decoded common signal is then ready to be played as a mixed representation of the messages. Additionally, the common signal may be passed through a de-multiplexer 224 where each message can be retrieved from its respective channel in the common signal and provided to its respective destination 228a-M. Each message may also be selectively played from the common signal on a single destination 228 or all messages may be simultaneously played from the common signal on a single destination 228 in the event that all signals have a common destination.

Figure 3:
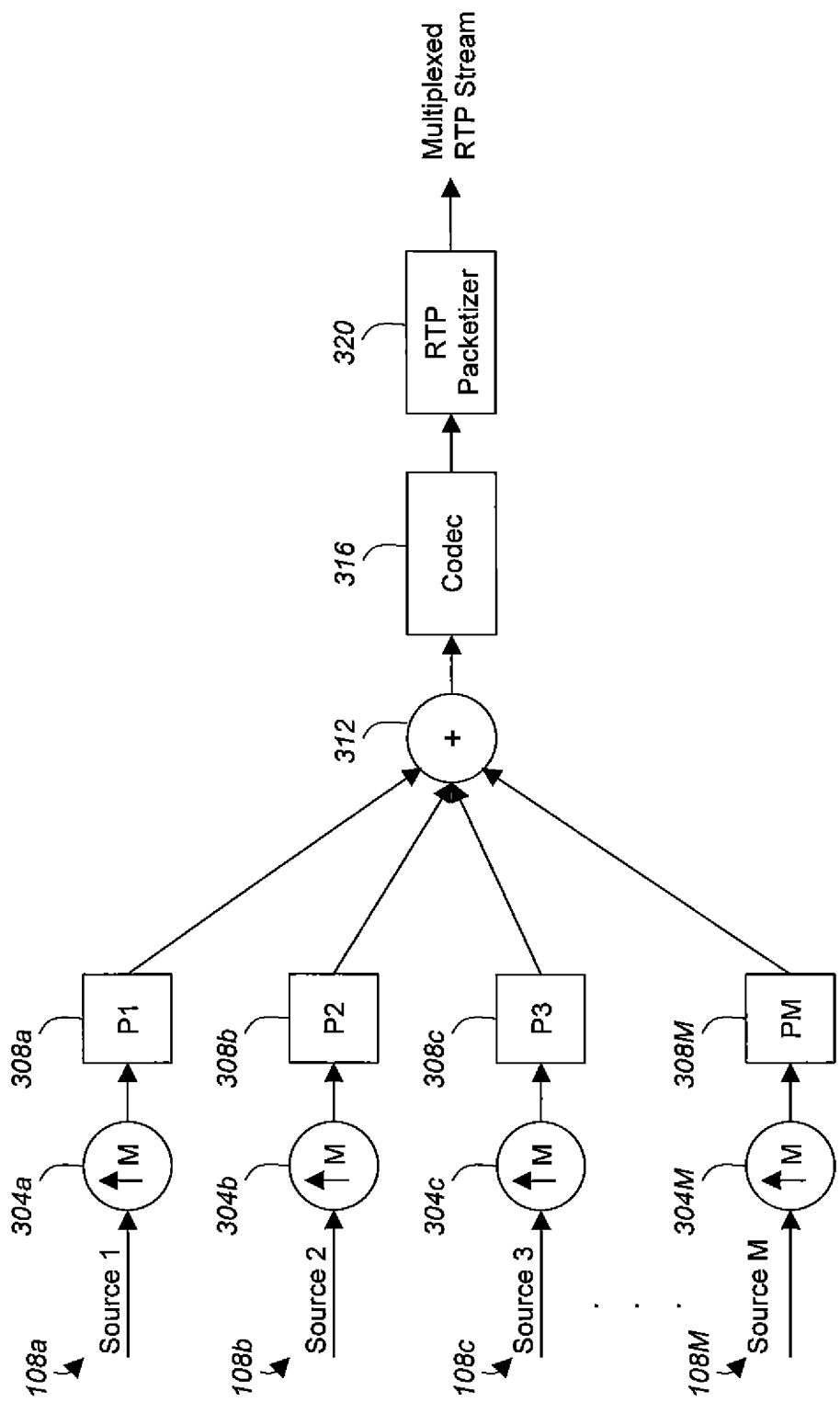
FIG. 3 is a block diagram of the components on the sending side of the signal processing system in accordance with embodiments of the present invention.

With reference now to FIG. 3, the sending side of the communication system 200 will be described in further detail in accordance with at least some embodiments of the present invention. The sending side of the communication system 200 may be embodied in a single node such as on a server or switch. Alternatively, the sending side of the communication system 200 may be distributed among a plurality of nodes in the communication system 200. For example, a sending communication device may carry out some portions of the sending side whereas a switch, server, gateway, or similar type of communication device may carry out other portions described in connection with the sending side. In accordance with at least some embodiments of the present invention, each signal received 108a-M from a signal source is passed through an upsampler 304a-M. Each upsampler 304a-M is operable to upsample any signal that is passed therethrough. The upsampling rate utilized by each upsampler 304a-M may be exactly the same. Alternatively, the upsampling rate may differ such that the signals all have the same sampling rate after they are upsampled. As an example, the upsampling rate may be equal to the number of signals being received by the multiplexer 204. In such an embodiment, each upsampler 304a-M may upsample a received signal to M times the original sampling rate.

The output signal then comprises a sampling rate of M times its original sampling rate when it is provided to a filter 308a-M. As noted above, the multiplexer 204 may comprise a filter bank that includes a plurality of filters 308a-M that are used to place each signal onto a particular channel. In accordance with at least one embodiment of the present invention, the filters 308a-M comprise linear filters, which together create a uniformly-spaced filter bank.

Figure 4:
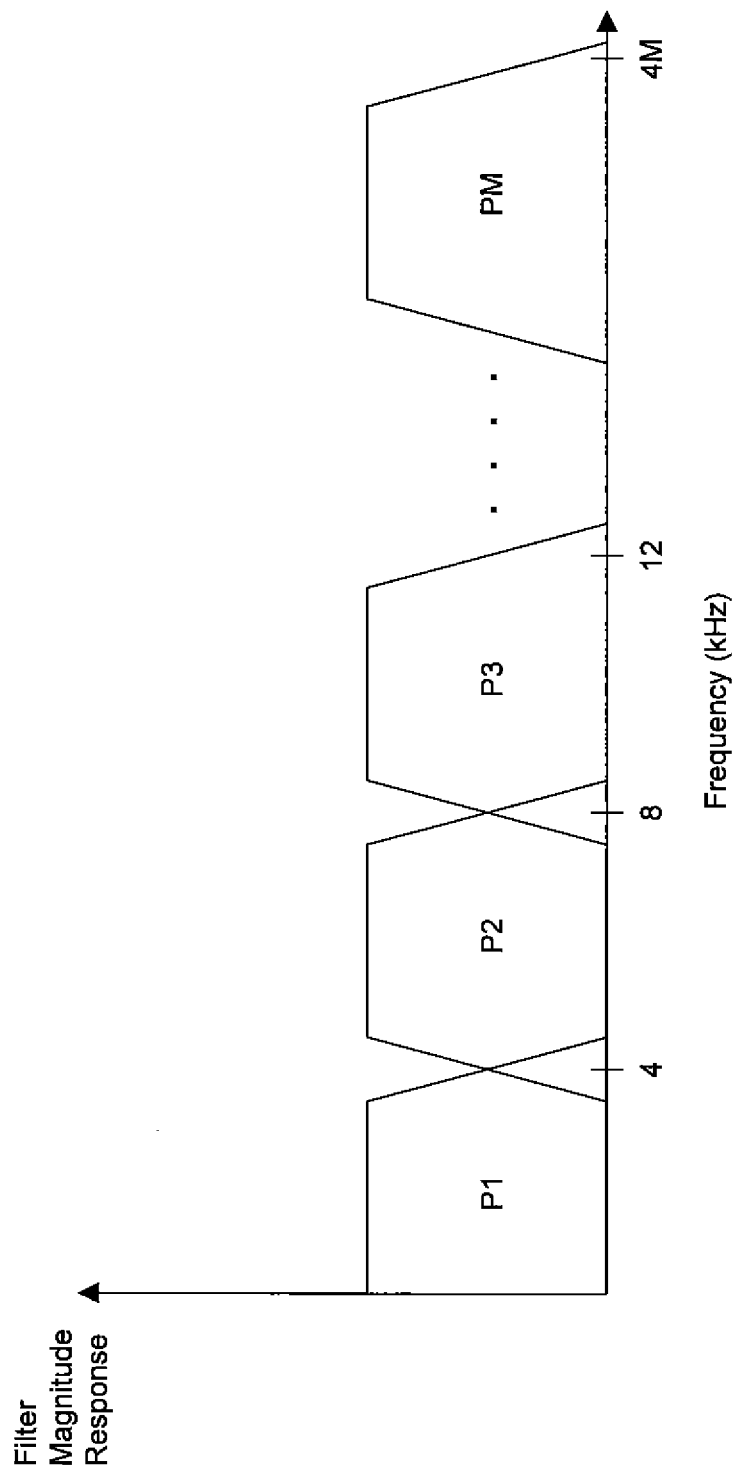
FIG. 4 is a graph depicting the frequency spectrum of a filter bank employed in accordance with embodiments of the present invention.

An exemplary filter bank used to process the incoming signals into M channels is shown in FIG. 4. As can be seen in FIG. 4, each filter 308a-M has an operating bandwidth that is tuned to a different frequency range. The result is that each signal and therefore each message is present at a different frequency in the frequency spectrum when the signals reside on the common message. This minimizes the amount of interference that will occur between each signal. The range of bandwidth allocated to each signal on the common signal may also be determined based on the number of signals being multiplexed into the common signal as well as the original bandwidth of the received signals. The filters 308a-M may be designed to ensure that the multiplexing and subsequent de-multiplexing process is lossless (i.e., does not introduce any distortion from end to end).

After each signal has been passed through its respective filter 308a-M, the signals are summed or mixed together at a summing junction 312, where the common signal results as an output. Since each signal has been upsampled and filtered, each individual signal will be maintained on a separate channel within the common signal. The upsampling, filtering, and combining of the separate signals are generally considered part of the multiplexing process. In accordance with at least some embodiments of the present invention, the multiplexing is performed at the sample level and before any encoding occurs. There is no need to perform a separate mixing stage. Rather, the mixing is performed implicitly as part of the multiplexing step.

In the depicted example, each filter 308a-M comprises an operational bandwidth of about 4 kHz. Each individual signal comprises a sampling rate of about 32 kHz after upsampling and filtering. The common signal comprising all of the mixed individual signals than comprises a sampling rate of about 32 kHz and a bandwidth equal to the number of signals times the operational bandwidth of each filter 308a-M. Thus, if four signals were multiplexed into the common signal and each filter comprises an operational bandwidth of about 4 kHz, then the common signal would comprise a bandwidth of about 16 kHz and a sampling rate of about 32 kHz.

After the signals have been mixed together at the summing junction 312, the common signal is passed through a codec 316. The codec 316 is similar to the codec 208 discussed with respect to FIG. 2. The codec 316 formats the common signal for transmission across the communication network 104. As previously noted, one inventive aspect of the present invention is that the multiplexing occurs at the sampling level before any encoding by the codec 316. This results in a cost savings for many channels since only one codec encoding and decoding stage is used on a plurality of signals because the plurality of signals are within the common signal when the codec is applied. A modest increase in computations is incurred as a result of the filters 304a-M in the filter bank. However, this can be minimized by using fast algorithms based on the Fast Fourier Transform.

The common signal is then passed through the RTP packetizer 320. The packetizer 320 is similar to the packetizer 212 discussed in relation to FIG. 2. The packetizer 320 may be operable to insert the contents of the common signal into packet payloads and provide a header and trailer for each packet payload. The header and/or trailer of the packet may comprise information related to the destination of the packet, the sampling rate of the packet, as well as an identifier that shows the packet comprises a plurality of signals that have been multiplexed into a common signal in accordance with embodiments of the present invention. By combining the plurality of signals into a common signal, the amount of packet overhead (i.e., header required per signal) is decreased because a single header can be used for a plurality of signals, which are multiplexed together. The header and/or trailer may also indicate that the common signal comprises a conferenced version of the plurality of multiplexed signals in the payload. The result at the sending end is a multiplexed RTP stream of data. The data can then be transmitted from the sending side across the communication network 104.

Figure 5:
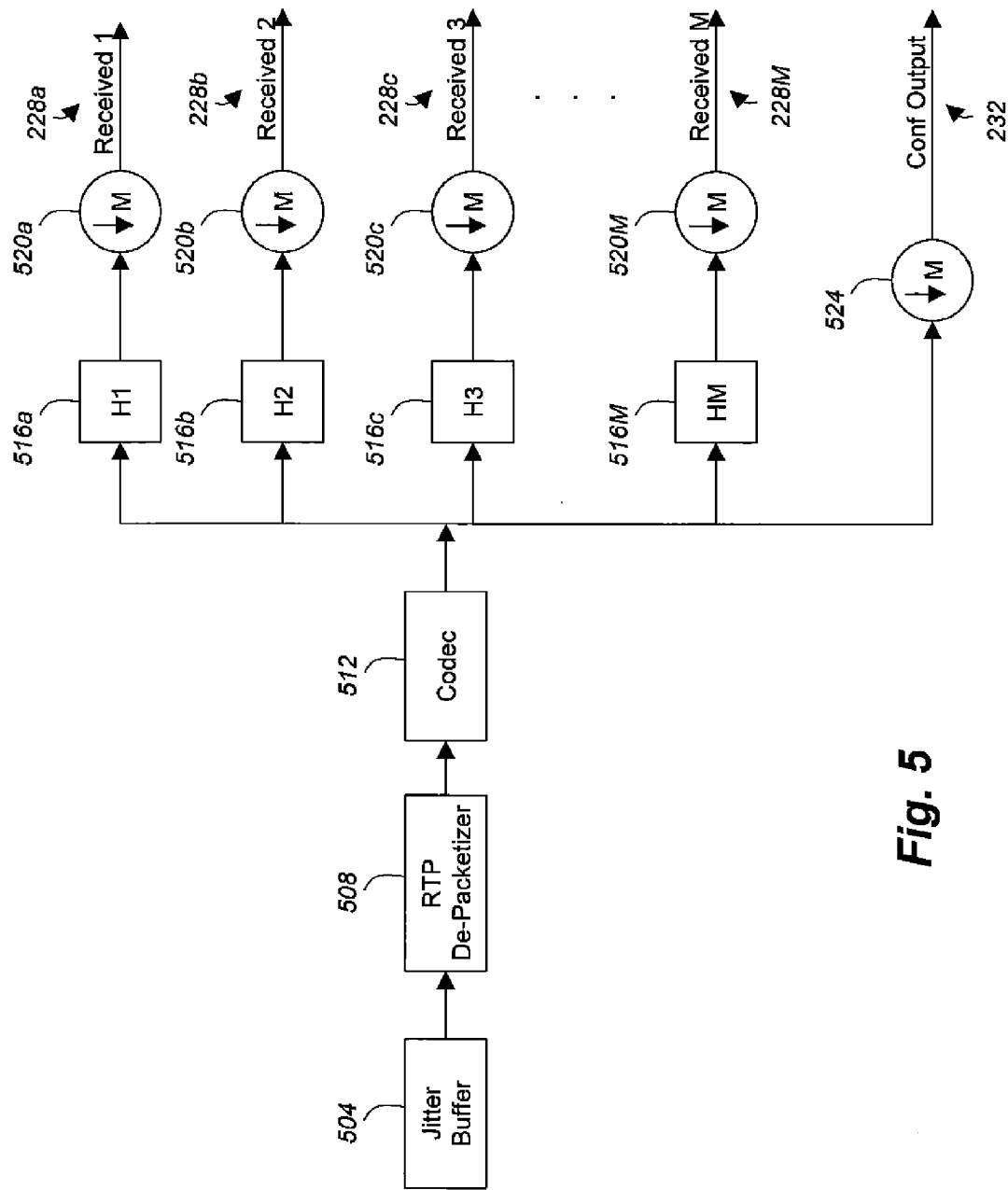
FIG. 5 is a block diagram of the components on the receiving side of the signal processing system in accordance with embodiments of the present invention.

Referring now to FIG. 5, the receiving side of the communication system 200 will be described in further detail in accordance with at least some embodiments of the present invention. The receiving side of the communication system 200 may be embodied in a single node such as on a server or switch. Alternatively, the receiving side of the communication system 200 may be distributed among a plurality of nodes in the communication system 200. For example, a receiving communication device may carry out some portions of the receiving side whereas a switch, server, gateway, or similar type of communication device may carry out other portions described in connection with the receiving side.

The receiving side of the communication system 200 may comprise a jitter buffer 504 that receives the packets transmitted from the sending side and organizes them, as necessary, into their original sequence. The jitter buffer 504 may reference information in the packet header and/or trailer to determine the appropriate sequence of packets. After a suitable number of packets have been received by the jitter buffer 504 and ordered correctly, the packets are provided to an RTP de-packetizer 508. The de-packetizer 508 is similar to the de-packetizer 216 discussed in connection with FIG. 2. The de-packetizer 508 is operable to read the header and/or trailer of the packets containing the common signal to determine the number of channels and individual signals are provided in the common signal and whether the packets also include a conferenced representation of the individual signals 108a-M. The de-packetizer 508 also retrieves the payload from the packets and converts it into the common signal.

The common signal is then provided to the codec 512. The codec 512 is similar to the codec 220 discussed in connection with FIG. 2. The codec 512 at the receiving side of the communication system 200 decodes the common signal, typically by applying the inverse of the codec that was applied at the sending side. Thereafter, the common signal can be handled in a number of different ways, depending upon the contents of the common signal. In accordance with at least some embodiments of the present invention, the common signal may be provided to a bank of filters comprising a plurality of filters 516a-M, which are similar to the bank of filters used in the multiplexing process. The filters 516a-M are used to separate each channel from the overall multiplexed common signal. The filters 516a-M may comprise time-reversed versions of the multiplexing filters 308a-M employed at the sending side. These filters 516a-M may comprise the same operational bandwidth as the multiplexing filters 308a-M.

The now separated signals are then provided to a downsampler 520a-M that downsamples each signal or output channel to its respective original sampling rate. The downsamplers 520a-M may downsample the signals by the same factor that the upsamplers 304a-M employed at the sending side. Once downsampled, each output signal 228a-M can be provided to its respective destination. Each signal 228a-M may be transmitted to a different destination in accordance with at least some embodiments of the present invention. Alternatively, two or more signals may be provided to the same destination. The use of the filters 516a-M is necessary to listen to or view each signal 228a-M separately at the same receiver or provide each signal 228a-M to its respective different destination.

On the other hand, in accordance with at least some embodiments of the present invention, if the goal is to listen to or view the conferenced version of all signals, then the signals are not passed through a filter bank. Rather, the common signal is passed through a downsampler 524 that selects every Mth (i.e., the number of signals included in the common signal) sample from the common signal and provided as an output signal 232 to its respective destination. The destination of the conferenced signal may comprise the same destination as one or more of the individual signals or may comprise a completely different destination.

With reference to FIGS. 6A-C, the process employed by the downsampler 524 to extract the conferenced version of the signals from the common signal without de-multiplexing the common signal is shown in accordance with at least some embodiments of the present invention. The signal depicted in FIG. 6A is the common signal output by the codec 512 and received at the downsampler 524. The downsampler 524 determines the number of signals 108a-M in the common signal and therefore determines which samples comprise the combined version of the signals 108a-M. In one embodiment, the downsampler 524 is provided with this information from the de-packetizer 508, which has determined this information from the packet header and/or trailer. Alternatively, the downsampler 524 knows a priori the number of individual signals 108 in the common signal and therefore knows which samples to select from the common signal. In the depicted embodiment, the number of signals 108 in the common signal is four. In such an example, the downsampler 524 will select every fourth sample (i.e., the first sample 604, the fifth sample 608, the ninth sample 612, the thirteenth sample 616, the seventeenth sample 620, and so on) from the common signal for the entirety of the common signal.

The non-selected samples are then discarded from the signal as can be seen in FIG. 6B. Thereafter, the downsampler 524 reduces the sampling rate of the signal to match the original sampling rate of the individual signals 108a-M. In other words, the downsampler 524 downsamples the common signal by the same factor as the individual signals 108a-M were upsampled. The resulting signal 232 is output to its identified destination for playing on an output device such as a monitor or speaker.

Figure 7:
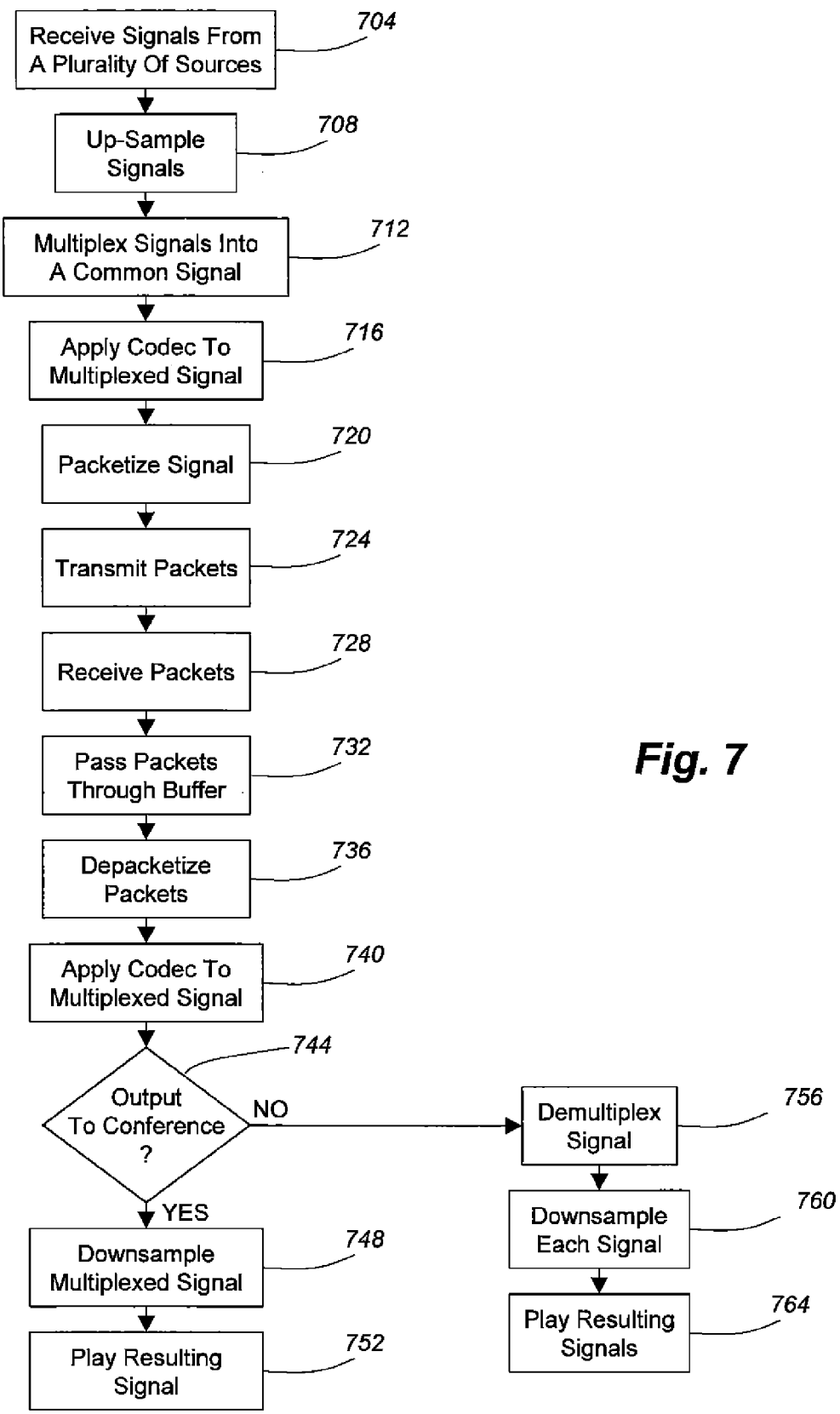
FIG. 7 is a flow chart depicting a signal processing method in accordance with embodiments of the present invention.

With reference now to FIG. 7, a method of processing signals will be described in accordance with at least some embodiments of the present invention. The method begins when a plurality of signals 108a-M are received from a plurality of signal sources (step 704). The plurality of received signals 108a-M are then upsampled (step 708). In accordance with at least some embodiments of the present invention, each signal 108a-M comprises a similar original sampling frequency and are upsampled by the same amount. Therefore, the resulting signals each comprise a similar upsampled sampling frequency. As can be appreciated, however, each of the signals 108a-M do not necessarily need to have the same original sampling frequency, in which case the signals are upsampled by different amounts so that the resulting signals have a common sampling rate.

Once the signals have been upsampled, the method continues by multiplexing the signals into a common signal (step 712). As noted above, any type of known multiplexing operation may be performed to combine the separate signals into a common signal. The individual signals may reside on the common signal in separate channels that can be defined by one or more of frequency, phase, and amplitude.

A codec 208, 316 is then applied to the common signal such that the signal is encoded for transmission across the communication network 104 (step 716). The codec may be chosen based upon the sampling rate of the common signal. The encoded signal is then packetized by a packetizer 212, 320 (step 720). In the packetization step, the contents of the encoded signal may be placed into a payload portion of a number of different packets and a header and/or trailer portion of the packet may be populated to identify the transmission order of the packet, the number of signals within the packet, and whether the payload comprises a common signal that can be played in the absence of de-multiplexing.

Thereafter, the packets are transmitted across the communication network 104 (step 724). The packets may be routed through communication conduit via one or more proxy servers, routers, gateways, and other communication network 104 devices. The packets are ultimately received (step 728) and passed through a buffer (step 732). The buffering step is employed to ensure that the packets are ordered according to their original transmission order.

After the packets have been properly ordered within the buffer, then the signal is de-packetized (step 736). The de-packetization step includes forming the payloads of the various packets back into the common signal and reading the various information provided in the packet headers and/or trailers. The information in the packet header and/or trailer may define the type of operations that can be performed on the common signal, such as whether or not the common signal can be played in the absence of de-multiplexing. The de-packetized common signal is then passed through another codec 220, 512 where it is decoded (step 740).

Once the common signal has been decoded, the method continues by determining whether the common signal is to be output as a conferenced version of the input signals 108a-M or whether the separate signals 108a-M are to be played separately (step 744). This determination step may be dynamically changed in response to the type of signal that a user wants to receive. As an example, a user may elect to cycle through each channel to listen to each signal 228a-M either automatically or by manually engaging an input on their receiving communication device. The user may also elect to first listen to the conferenced version of the signals then select one or more of the signals for that he/she would like to listen to individually.

In the event that common signal is to be played, the common signal is downsampled (step 748). The common signal may be downsampled the same amount that the original signals 108a-M were upsampled. Alternatively, if one or more original signals 108a-M had a different sampling frequency, then the common signal may be downsampled to the lowest, highest, or most used of the different sampling frequencies. After the signal has been downsampled, the resulting signal 232 is provided to a destination where it can be played without ever requiring a de-multiplexing operation (step 752).

Referring back to step 744, in the event that one or more of the signals are to be played separately, then the method continues by de-multiplexing the common signal into its separate signals (step 756). The de-multiplexing step causes the signals to be retrieved from their respective channels on the multiplexed common signal. The result of de-multiplexing the common signal is that each signal can now be provided to a different or the same destination. Once the signal has been separated into separate signals in the de-multiplexing step, the method continues by downsampling each signal 228a-M (step 760). In this step, each signal 228a-M is downsampled separate from all other signals 228a-M. The signals may, however, still be downsampled by the same amount. The amount of downsampling imposed on each signal 228a-M may be enough to restore the signal 228a-M to the sampling rate of the originally transmitted signal 108a-M. After downsampling, the signals 228a-M can be provided to their respective destinations and played for a user (step 764).

In accordance with at least some embodiments of the present invention, a hybrid multiplexing mode may be employed. In such an embodiment, signals that are to be combined into a common signal and possibly played as the common signal at the receiving end may be upsampled and multiplexed prior to being encoded. After encoding, the common signal may be combined with additional voice streams that have already been encoded separately in a second RTP multiplexer. This combination signal can then be packetized and transmitted across the communication network. Again, the header information in the packet may indicate that the packet contains a common signal that is capable of being played as a conferenced version of its individual signals without an additional multiplexing step as well as other individual signals that are to be separated from the transmitted signal by a first step of de-multiplexing. Upon receipt of the hybrid packet, the receiving end may de-packetize the packet then pass the signal through a first RTP de-multiplexer to separate the common signal from the other individual signals. At this point the common signal as well as the other individual signals can be decoded. The individual signals can then be sent to their respective endpoints for playing while the common signal can either be played without an additional de-multiplexing step or may be de-multiplexed and each signal may be played separately.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for processing a plurality of signals such as voice and video signals. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A non-transitory computer readable medium configured to store a Real-Time Transport Protocol (RTP) packet of an electronic message for use in a communication system, the RTP packet comprising:
   a header portion;
   a trailer portion; and
   a payload portion, wherein the payload portion of the RTP packet comprises first, second, and third sections, wherein the first section comprises information received from a first signal source, wherein the second section comprises information received from a second signal source, wherein the third section comprises a combination of the information from the first signal source and second signal source, and wherein information from the third section can be played in the absence of de-multiplexing.

2. The non-transitory computer readable medium of claim 1, wherein at least one of the header and trailer portion comprise an identifier that indicates the RTP packet comprises the third section and identifies the location of the third section in the payload portion.

3. The non-transitory computer readable medium of claim 1, wherein the first, second, and third sections can be selectively played by a communication device.

4. The non-transitory computer readable medium of claim 1, wherein the information in the first section is an upsampled version of the information as it was transmitted from the first signal source and wherein the information in the second section is an upsampled version of the information as it was transmitted from the second signal source.

5. The non-transitory computer readable medium of claim 1, wherein the third section is a conferenced combination of the first and second sections.

6. The non-transitory computer readable medium of claim 1, wherein the first signal source is a video signal source, and wherein the second signal source is a different video signal source.

7. The non-transitory computer readable medium of claim 1, wherein the first and second signal sources are each at least one of an audio source and a video source.

8. The non-transitory computer readable medium of claim 1, wherein the first section only comprises information received from the first signal source, and wherein the second section only comprises information received from the second signal source.

9. The non-transitory computer readable medium of claim 1, wherein the trailer portion comprises an identifier that indicates the RTP packet comprises the third section and identifies the location of the third section in the payload portion.

10. An apparatus for generating Real-Time Transport Protocol (RTP) packets for transmission in an electronic signal across a communication network, the apparatus comprising:
   an input configured to receive a multiplexed electronic signal comprising an RTP packet having a header portion, a trailer portion, and a payload portion, wherein the payload portion comprises first and second messages from respective first and second signal sources and a third message comprising a combination of the first and second messages;
   an output configured to output at least one of the first message, the second message, and the third message; and
   a filter bank configured to de-multiplex the electronic signal into the first and second messages, wherein the filter bank is employed to output the first and second messages and wherein the filter bank is not employed to output the third message.

11. The apparatus of claim 10, wherein the filter bank comprises a plurality of filters, wherein a first of the plurality of filters is used to retrieve the first message from the multiplexed electronic signal, and wherein a second of the plurality of filters is used to retrieve the second message from the multiplexed electronic signal.

12. The apparatus of claim 10, wherein:
   in the event that the third message is to be played as a conference of the first and second signals, the output is operable to provide the third message from the multiplexed electronic signal to a communication device for playing in the absence of de-multiplexing the multiplexed electronic signal, and
   in the event that the multiplexed electronic signal is not to be played as a conference of the plurality of signals, the filter bank is operable to de-multiplex the multiplexed electronic signal and the output is operable to provide at least one of the first and second message to a communication device for playing.

13. The apparatus of claim 10, wherein the apparatus is operable to read the header portion of the RTP packet to determine that the multiplexed electronic signal comprises the third message.

14. The apparatus of claim 10, wherein the first and second messages comprise at least one of an audio signal, a video signal, and a data signal.

15. The apparatus of claim 10, wherein the first signal source corresponds to a communication device being employed by a first conference participant, and the second signal source corresponds to a communication device being employed by a second conference participant.

16. The apparatus of claim 10, further comprising:
   a de-packetizer configured to read at least one of the header portion and the trailer portion of the packets and at least retrieve the third section from the packets.

* * * * *